United States Patent
Eminger et al.

[15] 3,636,990
[45] Jan. 25, 1972

[54] METHOD AND APPARATUS FOR WINDING DYNAMOELECTRIC MACHINE FIELD COILS

[72] Inventors: Robert J. Eminger; William N. Brown, both of Fort Wayne, Ind.

[73] Assignee: Fort Wayne Tool & Die Inc., Wayne, Ind.

[22] Filed: Dec. 17, 1969

[21] Appl. No.: 885,684

[52] U.S. Cl. ............................................. 140/92.1, 29/605
[51] Int. Cl. ........................................................ B21f 3/04
[58] Field of Search ................................. 140/92.1; 29/605

[56] References Cited

UNITED STATES PATENTS

| | | | |
|---|---|---|---|
| 2,782,809 | 2/1957 | Smallridge | 140/92.1 |
| 3,458,928 | 8/1969 | Crawford et al. | 29/605 |

*Primary Examiner*—Lowell A. Larson
*Attorney*—Hood, Gust, Irish & Lundy

[57] ABSTRACT

A method and apparatus for winding a plurality of interconnected dynamoelectric machine field coils providing intercoil connections of minimum length. At least two coil forms are provided each having a distal end and a proximal end secured to a support, the coil forms extending radially outwardly from the support in angularly spaced relation. Each coil form has at least two steps with the largest step adjacent the proximal end and the smallest step adjacent the distal end. A flyer-winder is provided supported for axial movement thereby to wind the coils on the coil forms. A first latching mechanism is provided for moving the flyer forwardly in incremental steps thereby to position the flyer for winding on the respective coil form steps, and a second latching mechanism is provided for moving the flyer rearwardly in incremental steps, likewise to position the flyer for winding on respective coil form steps. A traversing mechanism is provided for moving the flyer axially thereby to traverse the flyer across the coil form independently of the incremental steps provided by the latching mechanisms. With this construction, a part of a coil on one coil form is wound progressing in a forward direction from the proximal end toward the distal end with the starting end of the coil being adjacent the proximal end, and the remaining part of the coil is wound in a direction progressing rearwardly from the distal end toward the proximal end with the finishing end of the coil being adjacent the proximal end. Thus, when the support is rotated to move another coil form into winding relationship with the flyer, the starting end of the coil forms a continuation of the finishing end of the previously wound coil, both of these ends and the interconnection therebetween being adjacent the proximal ends of the respective coil forms and the support, thereby minimizing the length of the intercoil connections.

23 Claims, 9 Drawing Figures

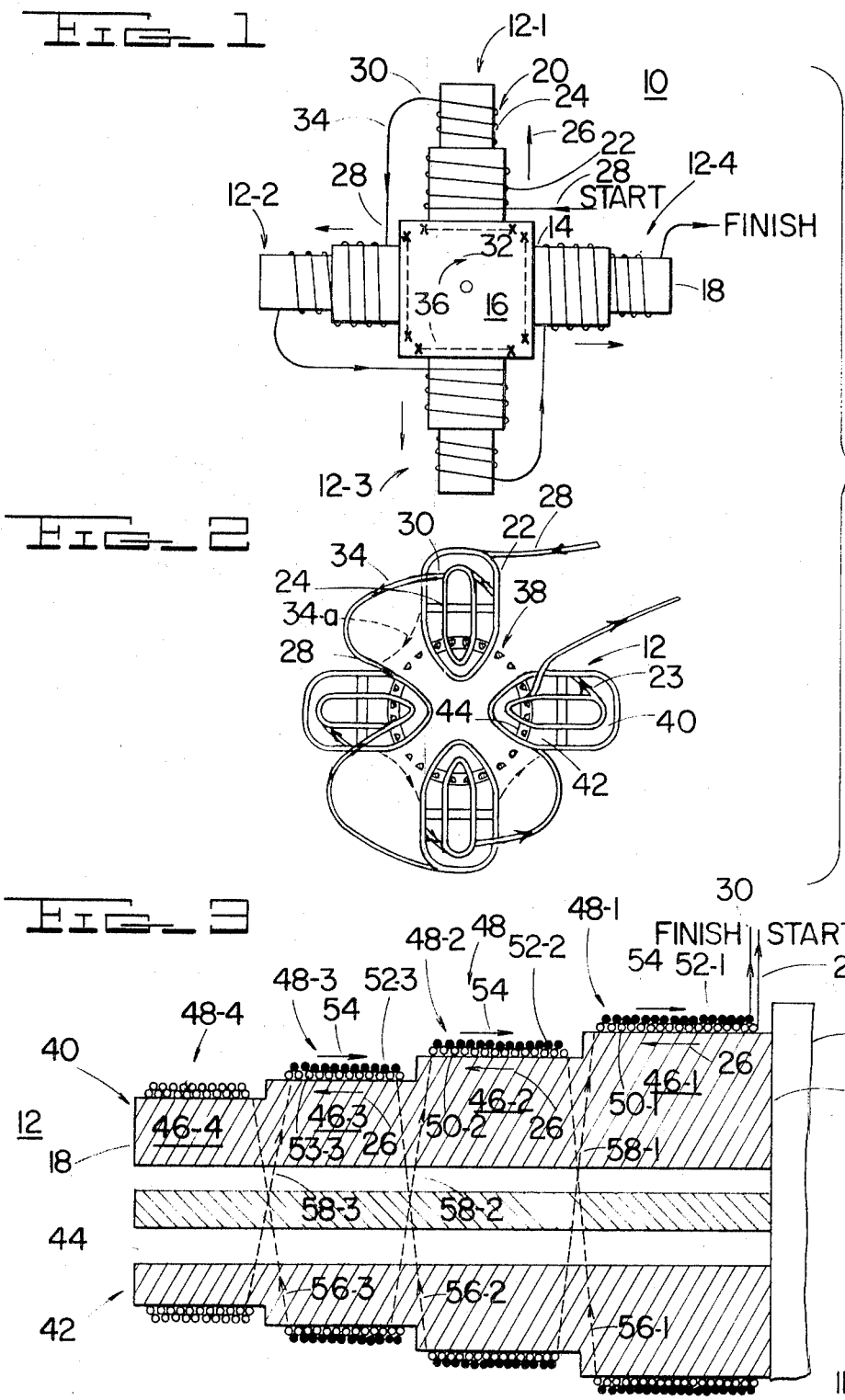

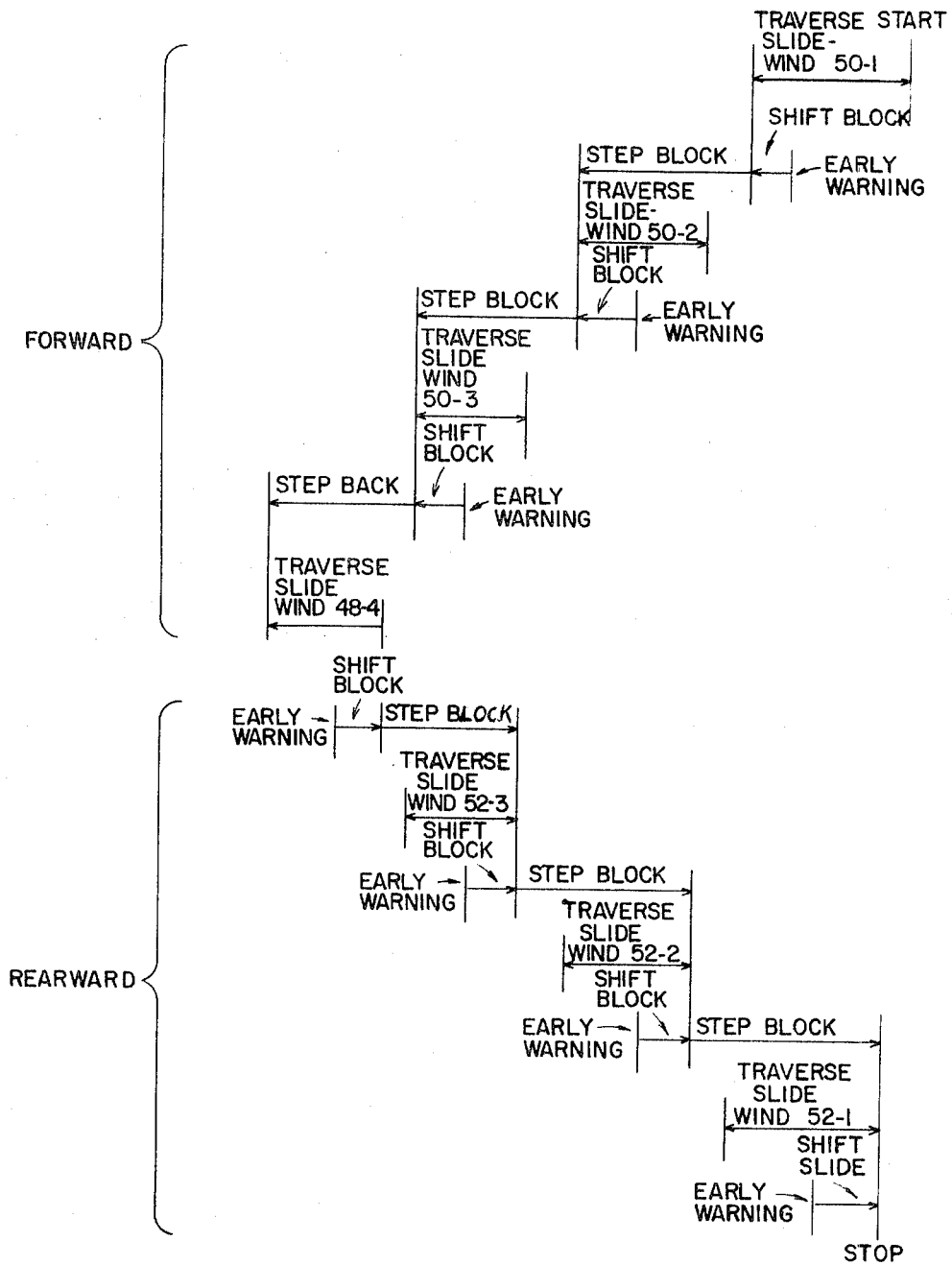

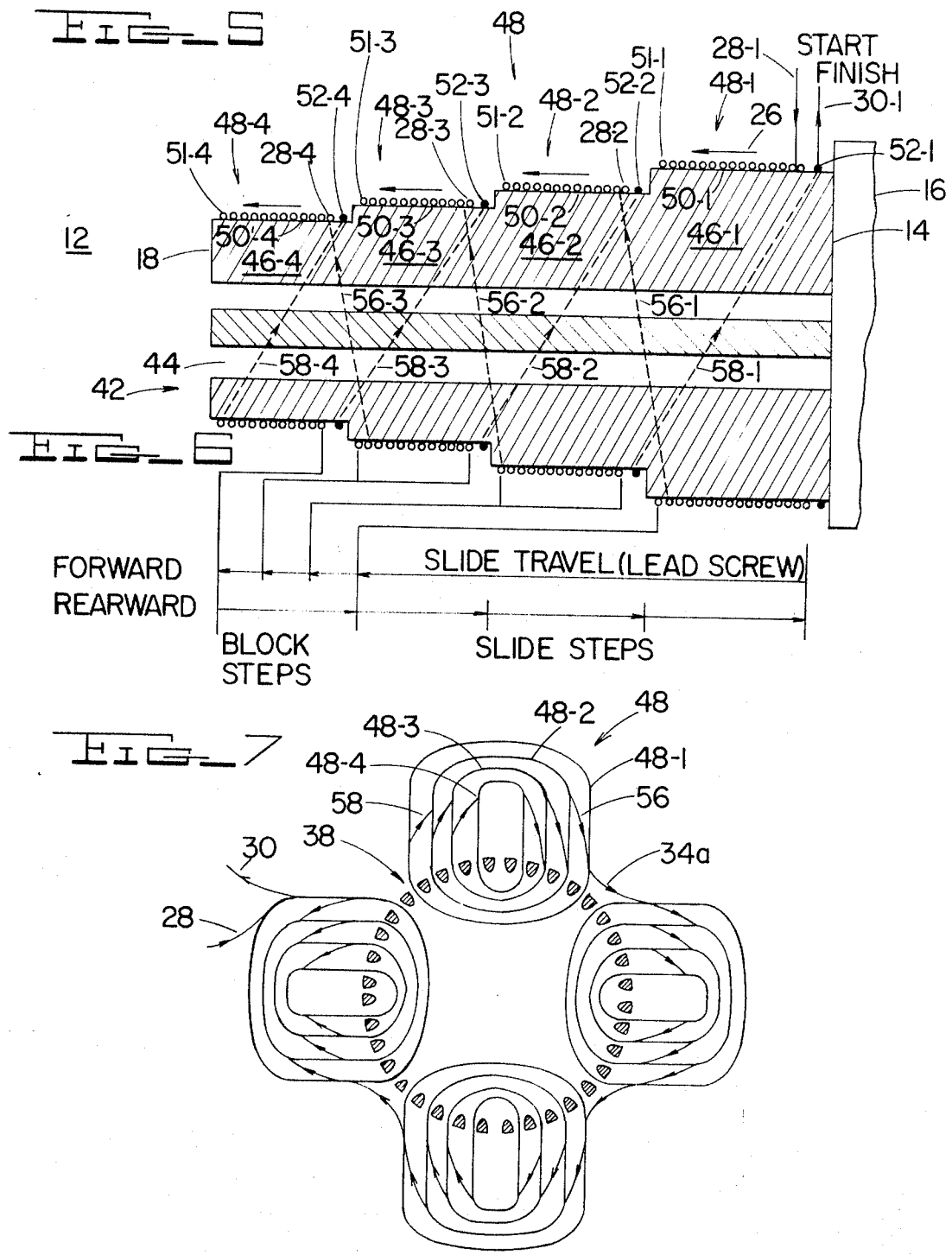

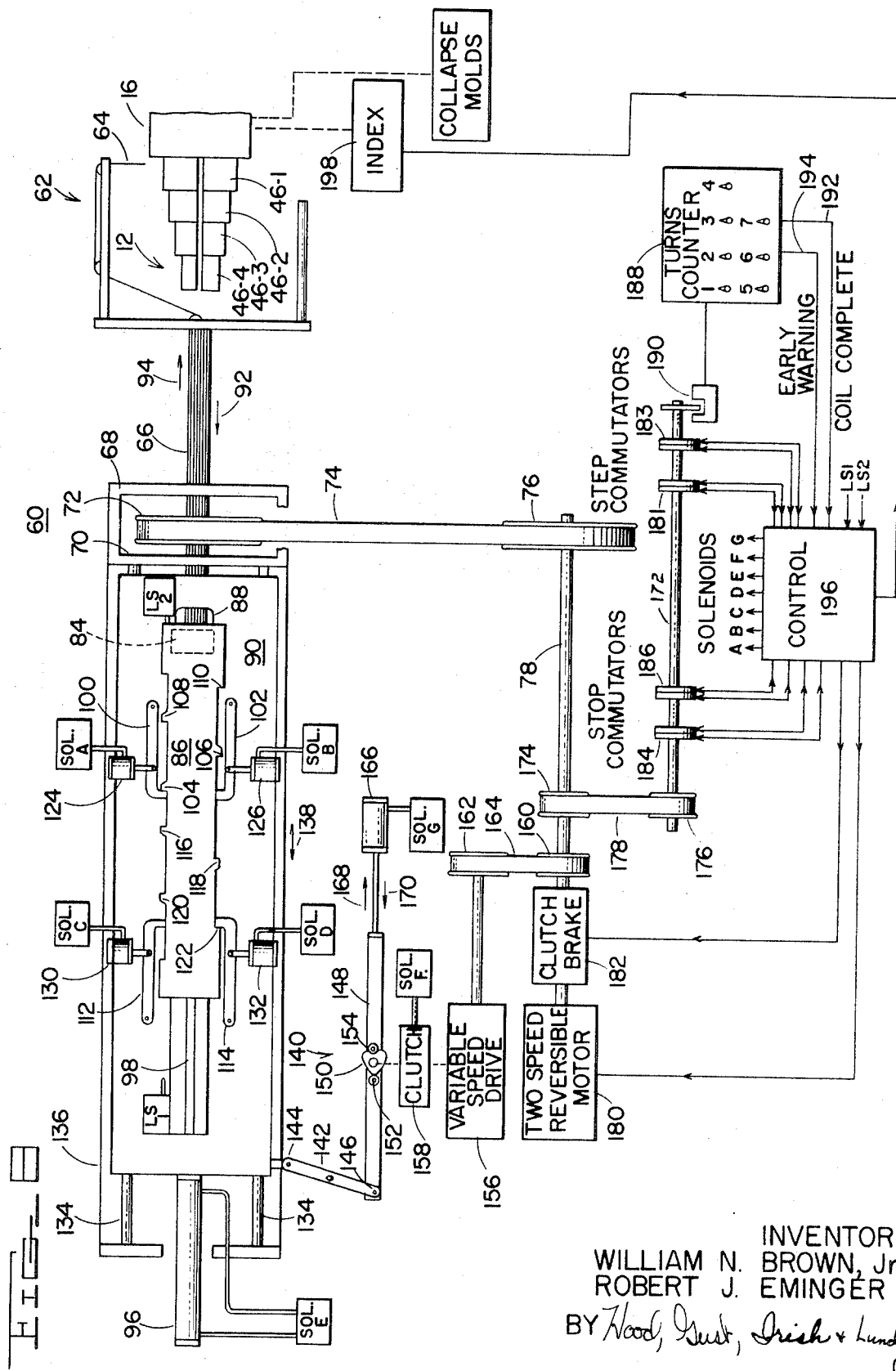

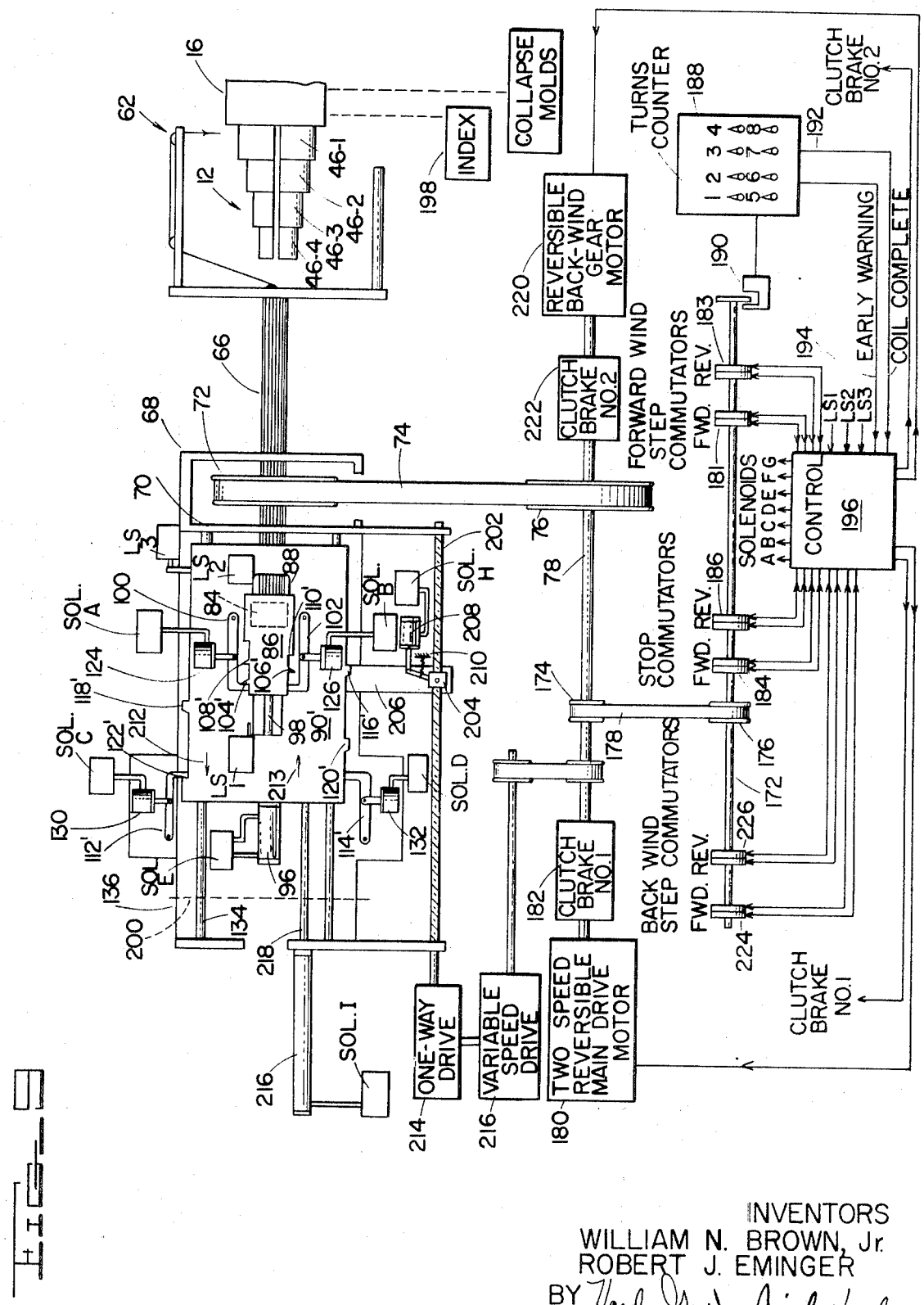

METHOD AND APPARATUS FOR WINDING DYNAMOELECTRIC MACHINE FIELD COILS

BACKGROUND OF THE INVENTION

1. Field of the Invention

This invention relates generally to methods and apparatus for winding dynamoelectric machine field coils, and more particularly to a method and apparatus for back-winding a part of each coil thereby to minimize the length of the intercoil connections.

2. DESCRIPTION OF THE PRIOR ART

In U.S. Pat. No. 3,415,292, there is disclosed apparatus for winding dynamoelectric machine coils upon stepped coil forms which are adapted to be transferred, with the coils thereon, to another location in cooperative relationship with the blades of coil insertion apparatus, such as that disclosed in U.S. Pat. No. 3,324,536, so as to permit the coils to be transferred directly from the coil forms onto the blades. In U.S. Pat. application Ser. No. 813,798, filed Mar. 19, 1969, now U.S. Pat. No. 3,575,219, granted Apr. 20, 1971, and assigned to the assignee of the present application, there is disclosed an apparatus and method for winding coils on a stepped coil form wherein a flyer is supported for axial movement with respect to the coil forms, means being provided for moving the flyer in incremental steps thereby to position the flyer in cooperative relationship with each of the coil form steps, and means also being provided for independently moving the flyer axially with respect to the coil form so as to traverse the flyer with respect to the coil form.

In the above referred to patents, and also in other methods and apparatus known to the present applicants for winding interconnected dynamoelectric machine field coils, such as the coils comprising either the main or starting winding for a four-pole, single-phase, alternating current motor, each coil comprises a plurality of sections respectively wound on the coil form steps and is wound on the form in a direction progressing outwardly from the rear or supported end of the form toward the forward or distal end of the form with the starting end of the coil thus being adjacent the coil form support and the finishing end being adjacent the distal end of the form. Thus, after completion of the winding of one coil and indexing of the coil form assembly to position the next coil form in winding relationship with the flyer, the intercoil connection extending between the finishing end of the previously wound coil and the starting end of the coil to be wound extends from the distal end of the previously wound coil form to the proximal end of the coil form at the winding station, the intercoil connection thus being of appreciable length. Resultantly, when the coil forms are folded downwardly so as cooperatively to mesh with the inserter blades as disclosed in U.S. Pat. No. 3,415,292, or the coils are otherwise removed from the coil forms for positioning on the inserter blades, the intercoil connections form a relatively long loop. Since this loop extends from the smallest section of one coil to the largest section of the adjacent coil, upon insertion of the coils into the slots of a stator core member, the intercoil or pole-to-pole connection loop necessarily crosses the end turns of the remaining sections of one coil at generally a right angle thereby causing a substantial risk of a short circuit.

SUMMARY OF THE INVENTION

In accordance with this invention, the above-described excessively long interpole connections and the consequent danger of a short circuit are eliminated by so winding the coils of adjacent poles so that the interpole connections extend between the largest sections of adjacent coils. Thus, the starting and finishing end of each coil is disposed adjacent the proximal end of the respective coil form so that the connection extending from the finishing end of one coil to the starting end of the adjacent coil is relatively short and does not cross over the end turns of other coil sections following insertion of the coils into the slots of the stator core member.

In accordance with the broader aspects of the method of the invention, at least one coil form is provided having a distal end and a proximal end. A part of a coil is wound on the form progressing in a forward direction from the proximal end toward the distal end with the starting end of the coil being adjacent the proximal end and, without severing the wire from which the coil is wound, the remaining part of the coil is wound on the form in a direction progressing rearwardly from the distal end toward the proximal end with the finishing end of the coil being adjacent the proximal end.

In accordance with the broader aspects of the apparatus of the invention, at least one coil form is provided having a distal end and a proximal end, and means are provided for supporting the proximal end of the coil form. Means are provided for winding a coil on the form, and for relatively moving the winding means axially with respect to the coil formed thereby to traverse the winding means across the form. Means are provided for actuating the moving means to wind a first part of a coil on the form progressing forwardly in a direction from the proximal end toward the distal end with the starting end of the coil being adjacent the proximal end, and to wind the remaining part of the coil on the form in a direction progressing rearwardly from the distal end toward the proximal end with the finishing end of the coil being adjacent the proximal end of the form.

It is accordingly an object of the invention to provide an improved method of winding dynamoelectric machine field coils.

Another object of the invention is to provide an improved method of winding dynamoelectric machine coils wherein the length of the interpole connections is minimized.

A further object of the invention is to provide an improved method of winding dynamoelectric machine field coils wherein the interpole connections extend from the largest section of one coil to the largest section of an adjacent coil.

Yet another object of the invention is to provide improved apparatus for winding dynamoelectric machine field coils.

A further object of the invention is to provide improved apparatus for winding dynamoelectric machine field coils which provides interpole connections extending between the largest section of one coil and the largest section of an adjacent coil.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a somewhat schematic view showing the winding of dynamoelectric machine field coils in accordance with the prior art;

FIG. 2 is a somewhat schematic view showing the coil forms of FIG. 1 arranged in coil-transferring relationship with the blades of coil insertion apparatus, and showing the interpole connections formed by the winding methods and apparatus of the prior art;

FIG. 3 is a cross-sectional view of one stepped coil form having a coil wound thereon in accordance with one method of the invention;

FIG. 4 is a diagram showing the method steps performed by the apparatus of FIG. 8 in forming the coil shown in FIG. 3;

FIG. 5 is a cross-sectional view showing one stepped coil form with a coil thereon wound in accordance with another embodiment of the method of the invention;

FIG. 6 is a diagram showing the method steps performed by the apparatus of FIG. 9 in forming the coil shown in FIG. 5;

FIG. 7 shows a four-pole motor winding wound in accordance with the method of the invention positioned on the blades of coil insertion apparatus;

FIG. 8 illustrates one embodiment of the apparatus of the invention; and

FIG. 9 illustrates another embodiment of the apparatus of the invention.

DESCRIPTION OF THE PREFERRED EMBODIMENTS

Referring now to FIGS. 1 and 2 which illustrate the prior art, there is shown a coil form assembly 10 for winding the coils comprising either the main or start windings for a four-pole, single-phase, alternating current motor, assembly 10 comprising four stepped coil forms 12-1, 12-2, 12-3 and 12-4. Each of the coil forms 12 has a proximal end 14 mounted on turret 16 and extending outwardly therefrom to a distal end 18. Each of the coil forms 12 is illustrated as having two steps with the larger step being adjacent the proximal end 14 and the smaller step being adjacent the distal end 18, it being understood that coil forms 12 may conventionally have three or four steps for respectively forming the concentric sections of the coil forming one pole. Here, each of the coil forms 12 is shown as having a coil 20 wound thereon comprising larger and smaller sections 22, 24 respectively wound on the larger and smaller steps.

In accordance with conventional practice, each of the coils 20 is wound on the respective coil form 12 in a direction progressing forwardly from the proximal end 14 to the distal end 18, as shown by the arrow 26, the starting end 28 of each coil thus being adjacent the proximal end 14 of the respective coil form and the finishing end 30 being adjacent the distal end 18. Upon the completion of the winding of one coil upon a respective coil form 12, the turret 16 with the coil forms 12 extending radially therefrom is rotated, as shown by the arrow 32 so as to bring the next coil form into winding relationship with the winding apparatus, typically a flyer winder (not shown), the finishing end 30 of the previously wound coil thus being connected to the starting end 28 of the adjacent coil by intercoil connection 34. It will be seen that in such a prior method, each intercoil connection 34 extends between the finishing end 30 of the smallest section 24 of one coil 20 and the starting end 28 of the largest section 22 of an adjacent coil.

Coil forms 12 may be of the type shown and described in the aforesaid U.S. Pat. No. 3,415,292, i.e., being pivotally mounted upon turret 16 to permit the coil forms to be folded downwardly to a position in which they can be moved into intermeshing, coil-transferring relationship with a circular array 38 of blades of coil insertion apparatus. As further shown in the aforesaid U.S. Pat. No. 3,415,292, each coil form 12 comprises first and second parts 40, 42 which are relatively collapsible to permit removal of the coils therefrom, parts 42 further having an arcuate recess therein which receives the blades 38 of the coil insertion apparatus.

Inspection of FIGS. 1 and 2 will reveal that when the coil forms 12 are folded downwardly from their positions shown in FIG. 1 to their coil-transferring positions, as shown in FIG. 2, the interpole connections 34, which extend between the smallest section of one coil and the largest section of the adjacent coil are in the form of loops of substantial length, each interpole connection of 34 further crossing over the turns of one coil from the finishing end of the smallest section of that coil to the starting end of the largest section of the adjacent coil, such crossover being generally at right angles to the turns of the one coil. The crossover connections between the larger and smaller sections 22, 24 of the same coil 20 are shown at 23 in FIG. 2.

Further reference to FIG. 2 will reveal that if the interpole connections 34 could be arranged to extend between the largest sections of adjacent coils 20, as shown by the dashed lines 34a, the length of the interpole connections could be substantially reduced, and also the aforesaid crossover condition would be eliminated.

Referring now to FIG. 3, there is shown a coil form 12 having four steps 46-1, 46-2, 46-3 and 46-4, the larger step 46-1 being adjacent the proximal end 14 and the smaller step 46-4 being adjacent the distal end 18. In accordance with the method of the invention, a coil 48 is wound on the steps of coil form 12, coil 48 having sections 48-1, 48-2, 48-3 and 48-4 respectively wound on the four steps 46-1, 46-2, 46-3 and 46-4. In this embodiment, a first part 50-1, 50-2 and 50-3 of coil sections 48-1, 48-2 and 48-3 is wound on the respective coil form steps with the winding progressing forwardly toward distal end 18, as shown by the arrows 26, all of the smallest section 48-4 is wound, and then the remaining parts 52-3, 52-2 and 52-1 of coil sections 48-3, 48-2 and 48-1 are wound over the first parts 50-3, 50-2 and 50-1, respectively, with the winding progressing rearwardly toward proximal end 14, as shown by the arrows 54.

It will now be seen that both the starting and finishing ends 28, 30 of coil 48 are adjacent the proximal end 14 of coil form 12. Thus, when the fully wound coil form 12 is indexed away from the winding station and an unwound coil form is indexed to the winding station, without severing the wire from which the coils are wound, the finishing end 30 of the previously wound coil 48 will be connected to the starting end 28 of the new coil to be wound, the interpole connection 34a (FIG. 7) thus extending between the largest sections 48-1 of the adjacent coils and being of minimal length.

In a specific embodiment of the method of the invention shown in FIG. 3 performed by the apparatus shown in FIG. 8, the winding of each of the first parts 50-1, 50-2, 50-3 of sections 48-1, 48-2 and 48-3 commences adjacent the rear end of the respective step 46-1, 46-2, 46-3, and proceeds in random, level-wind fashion with an oscillatory traversing motion until approximately one-half the total number of turns in the respective section 48-1, 48-2, 48-3, have been wound, the winding of the respective first part 50 terminating adjacent the forward edge of the respective step. The winding of section 48-4 on the smallest step 46-4 commences adjacent the rear edge of that step, proceeds in random, level-wind fashion with an oscillatory traversing motion until all of the desired number of turns have been wound, the winding of section 48-4 terminating adjacent the rear edge of step 46-4. The remaining parts 52-3, 52-2 and 52-1 are then similarly wound over the underlying first parts 50-3, 50-2 and 50-1 commencing adjacent the forward edge of the respective step and proceeding in random, level-wind fashion with an oscillatory traversing motion until the remaining one-half of the turns of the respective section have been wound, the winding terminating adjacent the rear edge of the respective step. Thus, in a specific embodiment, section 48-1 may have a total of 100 turns with parts 50-1 and 52-1 thus each having approximately 50 turns, section 48-2 may have a total of 80 turns with parts 50-2 and 52-2 respectively having approximately 40 turns, section 48-3 may have approximately 60 turns with parts 50-3 and 52-3 thus respectively having approximately 30 turns, and section 48-4 may have a total of 40 turns.

The crossover connections 56-1, 56-2 and 56-3 between parts 50-1 and 50-2, and 50-2 and 50-3, and between part 50-3 and section 48-1 are shown in dashed lines, these connections preferably being disposed in axial alignment on one side of the coil form 12. Crossover connections 58-3, 58-2 and 58-1 between section 48-4 and part 52-3, and between parts 52-3 and 52-2, and 52-2 and 52-1 are preferably disposed in axial alignment on the opposite side of the coil form 12 from the connections 56.

While in the specific embodiment of the invention above described, each of the first coil section parts 50 has substantially the same number of turns as the remaining parts 52, i.e., approximately one-half the total number of turns in the respective section, it will be understood that each of the first parts 50 may have a greater or lesser number of turns than the respective remaining part 52, provided the starting and finishing ends, respectively, of corresponding parts 50, 52 are adjacent the rear end of the respective step, and the finishing and starting ends, respectively, are adjacent the forward end. Further, while in the specific embodiment random, level-winding of the corresponding parts 50, 52 has been described, it will be readily understood that the respective parts 50, 52 may be wound in single-layer fashion.

Referring briefly to FIG. 7, the four coils 48 are shown following their transfer from the respective forms 12 to the blades 38 of the coil insertion apparatus. It will be observed again that the interpole connections 34a extend between the largest sections 48-1 of the coils 48, that they are of minimal length, and in particular that they do not extend across any remaining sections 48-2, 48-3, 48-4 of either coil to which they are connected. It will further be observed that the intersection crossover connections 56, 58 are respectively disposed on opposite sides of the sections. While the invention has been disclosed in connection with a four-pole winding and is considered to be particularly advantageous in the case of such windings, it will be understood that it may be employed in connection with winding configurations having a lesser or greater number of poles.

Referring now to FIG. 8, the apparatus of the invention for automatically performing the method above described in connection with FIG. 3, generally indicated at 60, comprises a flyer winder 62 for winding the wire 64 from which coils 48 are formed upon coil forms 12. Flyer 62 is mounted on a splined drive shaft 66 supported for rotational and axial movement by suitable bearings mounted on frame elements 68, 70. Shaft 66 and flyer 62 are rotatably driven by means of a pulley 72 having a splined connection with shaft 66. Pulley 72 is driven by belt 74 and pulley 76 on drive shaft 78. Shaft 78 and pulley 76 are driven by a conventional two-speed motor 180 through a conventional clutch-brake 182.

The end of splined shaft 66 remote from flyer 62 is rotatably attached to projection 84 on block 86. Projection 84 extends downwardly through a slot 88 in slide 90 which supports block 86 for longitudinal movement in forward and reverse directions parallel with the axis of shaft 66 between forward and rear positions defined, respectively, by limit switches identified as LS-1 and LS-2. Block 86 is shown in its rearward position in FIG. 8 with flyer 62 thus located in winding relationship with the largest step 46-1 of the respective coil form 12. It will thus be seen that forward movement of block 86 will be accompanied by forward movement of splined shaft 66 and flyer 62 in the direction shown by the arrow 92, and that rearward movement of block 86 will likewise be accompanied by rearward movement of splined shaft 66 and flyer 62 in the direction shown by the arrow 94.

A conventional pneumatic cylinder 96 is mounted on slide 90 and has its piston rod 98 connected to block 86. A suitable solenoid valve, identified as solenoid E, is coupled to cylinder 96 and selectively actuates the same so as to bias block 86, splined shaft 66 and flyer 62 either forwardly in the direction shown by the arrow 92, or rearwardly in the direction shown by the arrow 94.

Forward movement of block 86, shaft 66 and flyer 62 is selectively restrained by a pair of latch members 100, 102 pivotally mounted on slide 90 and cooperatively engaging abutments 104, 106, 108 and 110 on block 86. Rearward movement of block 86, shaft 66 and flyer 62 is similarly selectively restrained by a pair of latch members 112, 114, pivotally mounted on slide 90 and cooperatively engaging abutments 116, 118, 120 and 122 are respectively axially spaced apart on block 90 by distances corresponding to the respective axial lengths of the steps 46-1, 46-2, 46-3 and 46-4 of coil form 12. It will be observed that with the block 86 in its rearward position, as shown in FIG. 8, latch 100 engages abutment 104 and latch 112 engages abutment 122, thus locating flyer 62 in winding relationship with the largest coil form step 46-1.

Latches 100, 102 are respectively actuated by conventional pneumatic cylinders 124, 126 mounted on slide 90, cylinders 124, 126 being respectively actuated by solenoid valves respectively identified as solenoid A and solenoid B. Latches 112, 114 are respectively actuated by conventional pneumatic cylinders 130, 132 also mounted on slide 90, cylinders 130, 132 being respectively actuated by solenoid valves respectively identified as solenoid C and solenoid D.

It will now be seen that with solenoid E actuated to apply fluid pressure to cylinder 96 in the direction to move block 86, splined shaft 66 and flyer 62 forwardly in direction 92, such forward movement is initially restrained by latch 100 engaging abutment 104. Actuation of solenoid A and cylinder 124 will pivot latch 100 away from abutment 104 with the result that cylinder 96 will move block 86, splined shaft 66 and flyer 62 forwardly in the direction 92 by one incremental step until latch 102 engages abutment 106, thus locating flyer 62 in winding relationship with the next coil form step 46-2. Similarly, actuation of solenoid B and cylinder 126 will result in pivotal movement of latch 102 away from abutment 106 so that cylinder 96 moves block 86, splined shaft 66 and flyer 62 forwardly until latch 100 engages abutment 108, thereby locating flyer 62 in winding relationship with coil form step 46-3. Finally, actuation of solenoid A and cylinder 124 will result in pivotal movement of latch 100 away from abutment 108 with the result that cylinder 96 will move block 86, splined shaft 66 and flyer 62 forwardly until latch 102 engages abutment 110, flyer 62 thus being located in winding relationship with the smallest coil form step 46-4.

It will be observed that abutments 104, 106, 108 and 110 face forwardly, while abutments 116, 118, 120 and 122 face rearwardly, and it will further be observed that the surfaces of the abutments opposite from their latch-engaging surfaces are tapered. Thus, as block 86 is moved forwardly in sequential, incremental steps, as above described, under the control of latches 100, 102, latches 112, 114 are respectively cammed out of interferring relationship with abutments 120, 118, 116. In the forwardmost position of block 86 in which latch 102 engages abutment 110, latch 112 engages abutment 116.

Reversal of solenoid E will reverse the application of fluid pressure to cylinder 96 so that it biases block 86, shaft 66 and flyer 62 rearwardly in direction 94 such rearward movement being, however, initially restrained by engagement of latch 112 with abutment 116. It will now be readily seen that sequential actuation of solenoids C and D and their associated cylinders 130, 132 will similarly sequentially actuate latches 112, 114 sequentially to engage abutments 118, 120, 122, thereby permitting cylinder 96 to move slide 86, shaft 66 and flyer 62 rearwardly in incremental steps, sequentially to position flyer 62 in winding relationship with coil form steps 46-3, 46-2 and 46-1.

Slide 90 is mounted for axial movement parallel with the axis of shaft 66 by means of suitable rails 134 mounted on frame 136. Slide 90, along with block 86, shaft 66 and flyer 62 is moved axially in oscillatory fashion, as shown by arrow 138 by traversing mechanism 140, the throw of the oscillatory motion corresponding to the axial length of coil form steps 46-1, 46-2, 46-3 and 46-4. Thus, with block 86, splined shaft 66 and flyer 62 positioned in the rearmost position, as shown in FIG. 8, with flyer 62 in winding relationship with coil form step 46-1, oscillation of slide 90 will result in corresponding oscillatory traversing motion of block 86, shaft 66 and flyer 62 across coil form step 46-1 thereby to level-wind wire 64 on coil form step 46-1. Similarly, with block 86, shaft 66 and flyer 62 positioned with flyer 62 located in winding relationship with any one of the remaining coil form steps 46-2, 46-3, 46-4, as a result of the sequential, incremental stepping movement of block 86 above described, oscillation of slide 90 will result in oscillatory traversing motion of block 86, splined shaft 66 and flyer 62 across the respective coil form step thereby to level-wind wire 64 thereon.

Traversing mechanism 140 comprises pivoted lever member 142 having end 144 connected to slide 90 and its other end 146 connected to actuating member 148. Actuating member 148 is oscillated reciprocally by means of heart-shaped cam 150 cooperating with cam follower rollers 152, 154 on member 148. Heart-shaped cam 150 is driven by selectively variable speed drive 156 through a clutch 158. Clutch 158 normally couples heart-shaped cam 150 to variable speed drive 156 being actuated to decouple cam 150 from drive 156 by actuation of solenoid valve F. Variable-speed drive 156 is driven by drive shaft 78 through pulleys 160, 162 and belt 164.

With solenoid F actuated to actuate clutch 158 to decouple cam 150 from drive 156, actuating member 148 is moved to one or the other of its extreme positions by pneumatic cylinder 166 actuated by solenoid valve G. Thus, with clutch 158 actuated to decouple cam 150 from drive 156, retraction of cylinder 166 will move actuating member 148 in the direction shown by the arrow 168, thereby to shift slide 90, shaft 66 and flyer 62 to the forward end of the oscillatory traversing throw of slide 90 so as to position flyer 62 adjacent the forward end of the respective coil form step 46. Likewise, extension of cylinder 66 will move actuating member 148 in the direction shown by the arrow 170 thereby to shift slide 90 to the rear end of its oscillatory, traversing throw so as to position flyer 62 adjacent the rear end of the respective coil form step. With clutch 158 deactuated to uncouple cam 150 from variable speed drive 156, it will be seen that movement of actuating member 148 by cylinder 166 in either direction will result in rotation of cam 150. Thus, when clutch 158 is again actuated to couple cam 150 to variable speed drive 156, cam 150 will immediately commence imparting the oscillatory motion to actuating member 148 and slide 90.

It is desirable that the intersection connections 56, 58 be accurately located at predetermined positions, as shown in FIG. 7, and it is thus desirable that the flyer 62 have a predetermined rotational position with respect to the coil form 12 when the flyer is moved rearwardly or forwardly by an incremental step into winding relationship with the next coil form step. Further, it is desirable that the flyer have a predetermined rotational position with respect to the coil form 12 upon completion of a coil. These predetermined rotational positions may be at different locations for forward and reverse directions of rotation of flyer 62; it is conventional practice to wind the coil forming one pole in one direction and the coil forming the adjacent pole in the opposite direction.

In order to provide for stepping and stopping flyer 62 at the desired rotational positions with respect to the coil form 12 in each direction of rotation, a timing shaft 172 is driven from drive shaft 78 by pulleys 174, 176 and belt 178. Stepping commutators 181, 183 and stopping commutators 184, 186 are mounted on shaft 172 and with cooperating contacts control the timing of the stepping and stopping operations. It will be understood that timing shaft 172 is driven at the same rotational speed as flyer 62. The number of revolutions of flyer 62 and thus the number of turns wound on the respective coil form steps 46 are counted by a conventional turns counter 188 which counts the number of revolutions of timing shaft 172 by means of a conventional photoelectric device 190. Counter 188 is conventional and includes an appropriate means for presetting the number of turns to be wound on each of the coil form steps 46. In the case of the coil shown in FIG. 3, it will be observed that there are a total of seven coil parts, i.e., parts 50-1, 50-2 and 50- 3, section 48-4, and parts 52-3, 52-2 and 52-1. Thus, counter 188 has appropriate dials for presetting the desired number of turns for each of these coil parts. Counter 188 provides a turn-completion signal in its output circuit 192 in response to completion of the predetermined number of turns in each of the coil parts. Further, counter 188 provides an early warning signal in its early warning output circuit 194 a predetermined number of turns in advance of completion of a respective coil part, such as four turns.

A control circuit 196 is provided to which the contacts associated with the stepping and stopping commutators 181, 183, 184 and 186 are connected, along with the coil completion and early warning output circuits 192, 194 of turns counter 188, and the limit switches LS-1 and LS-2, control circuit 196 being coupled to actuate the solenoids A, B, C, D, E, F and G, and the motor 80 and clutch brake 82 in the proper sequence, now to be described.

Referring now additionally to FIGS. 3 and 4, immediately prior to winding a new coil 48 on a coil form 12, turret 16 has been indexed by indexing mechanism 198 to position a coil form 12 at the winding station in winding relationship with flyer 62. Upon completion of the winding of the previous coil, flyer 62 has been stopped by actuation of clutch brake 182 by control 196 in response to one of the stopping commutators 184, 186, block 86 together with splined shaft 66 and flyer 62 have been moved to their rearmost position, and slide 90 has been moved to its rearmost position, thereby to position flyer 62 to commence winding of a new coil adjacent the rear end of the largest coil form step 46-1, so that the starting end 28 of coil 48 is positioned as shown in FIG. 3 adjacent the rear end of the largest step 46-1. Thus, the apparatus is positioned as shown in FIG. 8 for commencing the winding of a new coil 48.

Winding of the first part 50-1 of coil section 48-1 on the largest step 46-1 then commences, solenoid F being deactuated so as to actuate clutch 158 to couple variable speed drive 156 to heart-shaped cam 150, clutch brake 182 being actuated to couple motor 180 to shaft 78, and motor 180 being energized for high-speed operation. Slide 90, block 86, shaft 66 and flyer 62 are thus oscillated back and forth across coil form step 46-1 thereby to level-wind the first coil part 50-1 thereon. Upon the appearance of the early warning signal in output circuit 194 of counter 188, solenoid F is actuated by control 196 to deactuate the clutch 158 and thereby decouple heart-shaped cam 150 from variable-speed drive 156, motor 180 is energized for low-speed operation, generally approximately one-half its higher speed, and solenoid G is actuated thereby moving actuating member 148 in direction 168 so as to move slide 90, block 86, shaft 66 and flyer 62 forwardly to the forward extremity of the throw of slide 90, thereby to position flyer 62 adjacent the forward end of the largest coil form step 46-1. Appearance of the turn completion signal in output circuit 192 of turns counter 188 indicating completion of the preselected number of turns in the first coil part 50-1, together with a signal from the appropriate stepping commutators 181, 183 responsive to proper rotational positioning of flyer 62, actuates control 196 thereby to actuate solenoid A to release latch 100. With solenoid E previously actuated so that cylinder 96 is biasing block 86 forwardly in direction 92, block 86, shaft 66 and flyer 62 will then immediately be stepped forwardly until latch 102 engages abutment 106 thereby to position flyer 62 adjacent the forward end of the second coil form step 46-2. Solenoids F and G are then deenergized so that clutch 158 again couples heart-shaped cam 150 to variable-speed drive 156 and motor 180 is again energized for high-speed operation so that the second coil part 50-2 is level wound on the second step 46-2. Upon completion of the winding of part 50-2, the block 86, shaft 66 and flyer 62 are again shifted, slide 90 is again moved to its forward position, and coil part 50-3 is level-wound in the same manner. Upon completion of coil part 50-3, block 86 is shifted to its forwardmost position, slide 90 is again moved to its forward position, and the winding of the smallest coil section 48-4 commences.

Recalling that block 86, shaft 66 and flyer 62 have been shifted to their forwardmost position upon initiation of winding of the smallest coil section 48-4, limit switch LS-1 is actuated which, through control 196, actuates solenoid E to reverse cylinder 96 so that it now biases block 86 rearwardly in direction 94, rearward movement however being restrained by engagement of latch 112 with abutment 116. Actuation of limit switch LS-1 also actuates control 196 to render the other stepping commutator effective, i.e., assuming that commutator 181 had been utilized to control the stepping function during the winding of coil parts 50-1, 50-2 and 50-3, commutator 183 will now be utilized to control the stepping functions during rearward movement of block 86.

Upon appearance of the early warning signal indicating near-completion of the smallest coil section 48-4, solenoids F and G are actuated to move actuating member 148 in direction 170 thereby to move slide 90 to the rearward end of its throw so as to position flyer 62 adjacent the rear end of coil form step 46-4, and motor 180 is energized for its low-speed operation. Upon appearance of the coil section 48-4, and when stepping commutator 183 provides a signal indicating the proper rotational position of flyer 62, solenoid C is actuated by control 196 thereby to actuate cylinder 130 to release latch 112 permitting cylinder 96 to move block 86, shaft 66 and flyer 62 rearwardly in direction 94 so as to position flyer 62 adjacent the rear end of coil form 46-3 to commence winding of coil part 52-3 over the previously wound coil part 50-3. Solenoids F and G are then deactuated, motor 180 is again energized for high-speed operation, and the winding of coil part 52-3 then proceeds as above described.

The sequential rearward stepping of block 86 and rearward shifting of slide 90 then continues, as above described, thereby to wind coil parts 52-2 and 52-1 respectively over the previously wound coil parts 50-2 and 50-1. Upon appearance of the coil completion signal indicating completion of the coil part 52-1 and thus completion of the entire coil 48, and the respective stopping commutator, such as 184, being rotated to the appropriate position, clutch brake 182 is actuated so as to stop flyer 62 at the desired position. Indexing mechanism 198 is then actuated to index turret 16 so as to rotate the now fully wound coil form 12 away from the winding station and to rotate an unwound coil form 12 to the winding station. Actuation of limit switch LS-2 by movement of block 86 to its rearmost position actuates control 196 again to actuate solenoid E to reverse cylinder 96 to bias block 86 rearwardly for the next coil winding operation, and sets up the appropriate stepping and stopping commutators for the next coil winding operation.

A control system suitable for adaptation to the apparatus shown in FIG. 8 is more fully shown and described in the aforesaid U.S. Pat. No. 3,575,219, and also in U.S. Pat. application Ser. No. 811,016, now U.S. Pat. No. 3,578,034 granted May 11, 1971, also assigned to the assignee of the present application.

Referring now to FIG. 5 of the drawings, a second embodiment of the method of the invention is shown wherein the four sections 48-1, 48-2, 48-3 and 48-4 of coil 48 are respectively wound on steps 46-1, 46-2, 46-3 and 46-4 of coil form 12 in single-layer fashion. Here, starting end 28-1 of first part 50-1 of coil section 48-1 on the largest coil form step 46-1 is spaced forwardly from the rear end of coil form step 46-1, and the winding of parts 50-1 progresses forwardly in single layer fashion in direction 26 to a point adjacent the forward end of step 46-1. Starting ends 28-2, 28-3 and 28-4 of first parts 50-2, 50-3 and 50-4, respectively, are also respectively spaced from the rear end of the respective coil form steps 46-2, 46-3 and 46-4. Finishing ends 51-1, 51-2, 51-3 and 51-4 of the respective coil parts 50 are adjacent the front ends of the respective coil form steps 46, with the connections 56-1, 56-2 and 56-3 extending between the finishing end 51 and the starting end 28 of adjacent parts 50 being disposed in axial alignment on one side of the coil form, as shown by the dashed lines.

It will thus be seen that the first parts 50 of coil 48 are wound in single-layer fashion progressing forwardly in direction 26 with the starting end 28-1 of part 50-1 being adjacent the rear end of the largest step 46-1, i.e., adjacent proximal end 14 of coil form 12, but being spaced therefrom, and the finishing end 51-4 of part 50-4 being adjacent the forward end of the smallest step 46-4, i.e., adjacent distal end 18 of coil form 12.

In this embodiment, the first parts 50 of the sections of coil 48 have a substantially greater number of turns than the remaining parts 52, the remaining parts 52 preferably having only one or two turns and being respectively disposed in the spaces between the starting ends 28 of the first coil parts 50 and the rear end of the respective step. Thus, during the backwinding of the remaining coil parts 52, which progresses rearwardly from distal end 18 toward proximal end 14 of coil form 12, finishing end 51-4 of the smallest first coil part 50-4 is connected by crossover portion 58-4 to remaining part 52-4 wound in the space between starting end 28-4 of first part 50-4 and the rear end of the smallest step 46-4. Similarly, crossover portions 58-3, 58-2 and 58-1, indicated by the dashed lines, respectively connect remaining coil parts 52-4, 52-3, 52-2 and 52-1 as shown, the finishing end 30-1 of coil part 52-1, which is also the finishing end of the complete coil 48, being adjacent the proximal end 14 of coil form 12.

It will now be seen that in this embodiment, each coil section 48-1, 48-2, 48-3 and 48-4 comprises two parts 50 and 52, the first parts 50 being wound progressing forwardly in direction 26 from the proximal end 14 toward the distal end 18 of the coil form 12, the remaining parts 52 being wound rearwardly from distal end 18 toward proximal end 14 with the starting and finishing ends 28, 30 of coil 48 both being adjacent proximal end 14. Crossover portions 58-4 are preferably disposed in axial alignment on the opposite sides of coil form 12 from connections 56. It will be observed that the crossover portions 58 extend helically over the turns of the respective first part 50 from the finishing end 51 thereof to the respective coil part 52. As indicated, the remaining coil parts 52 may comprise one or two turns, or the respective connecting portion 58 and remaining coil part 52 may together form only one turn.

Brief reference again to FIG. 7 will reveal that when the completed coils 48 formed by the second embodiment of the method of the invention described above and illustrated in FIG. 5 are assembled on the blades 38 of the coil insertion apparatus, the interpole connections 34a again extend between the largest coil sections 48-1 of adjacent poles and are of minimum length.

Referring now to FIG. 9 of the drawings, the second embodiment of the apparatus is shown for performing the method described above in connection with FIG. 5. Here, in which like elements are indicated by like reference numerals, slide 90', rather than being oscillated with a throw corresponding to the axial length of the coil form steps 46 thereby to level-wind the coils on the respective coil form steps, is continuously traversed from its extreme rearward position, as shown in FIG. 9, to an extreme forward position, as shown by the dashed line 200, by a lead screw 202, thereby to traverse the flyer 62 from the rear end of the largest coil form step 46-1, i.e., adjacent proximal end 14 of coil form 12, to the forward end of the smallest coil form step 46-4, i.e., adjacent the distal end 18 of the coil form 12, so as to single layer wind the coil parts 50 upon the respective coil form steps. A half nut 204 is pivotally mounted on bracket 206 attached to slide 90' and is arranged selectively to engage and disengage lead screw 202. Half nut 204 is actuated to its disengaged position by pneumatic cylinder 208 actuated by solenoid valve H. Half nut 204 is returned to its engaged position upon deactuation of solenoid H by a suitable spring 210.

Lead screw 202 is driven in one direction so as to move slide 90' together with block 86', splined shaft 66 and flyer 62 rearwardly in the direction shown by arrow 212, when half nut 204 is engaged with lead screw 202, by a conventional one-way drive mechanism 214, driven in turn by a variable-speed drive mechanism 216 from drive shaft 78. Thus, with block 86' and slide 90' respectively in their rearward positions, as shown in FIG. 9, locating flyer 62 at its initial position adjacent the rear end of coil form step 46-1, and with half nut 204 actuated to engage lead screw 202, slide 90', block 86', splined shaft 66 and flyer 62 will be moved forwardly in direction 212 thereby to traverse flyer 62 across the entire coil form 12.

In this embodiment, block 86', splined shaft 66 and flyer 62 are not moved forwardly in incremental steps corresponding to the axial lengths of the coil form steps 46, as in the case of the embodiment of FIG. 8, but on the contrary the lengths of the incremental steps correspond to the axial distance between the finishing end 51 of one first coil part 50 and the starting end 28 of the adjacent first coil part on the adjacent step. Further the cumulative length of the incremental steps in the illustrated embodiment corresponds generally to the axial length of the smallest coil form step 46-4. Thus, abutments 104', 106', 108' and 110' on block 86' which cooperate with latches 100, 102 are axially spaced apart by only the axial spacing between the finishing end 51 and the starting end 28 of adjacent first coil parts 50 (FIG. 5).

Slide 90' is biased rearwardly in the direction shown by the arrow 213 by a suitable pneumatic cylinder 216 mounted on frame 136 and having its piston rod 218 connected to slide 90'. Cylinder 216 is actuated by solenoid valve I. Rearward motion of slide 90', block 86', splined shaft 66 and flyer 62 is restrained by latches 112', 114' pivotally mounted on frame 136 and cooperating with abutments 122', 120' and 118' on slide 90' which, in conjunction with the rearward motion of block 86 by cylinder 96 provides the rearward incremental steps of flyer 62 to wind remaining coil parts 52 on the respective coil form steps 46 (FIG. 5). Abutments 122', 120' and 118' are axially spaced apart by distances corresponding to the axial length of the coil form steps 46.

In this embodiment, the backwinding of the remaining coil parts 52 is performed at an extremely low speed as compared with the high and low winding speeds provided by main drive motor 180. To provide this very low speed for backwinding for the remaining coil parts 52, an auxiliary backwinding gear motor 220 is provided coupled to drive shaft 78 by a second clutch brake 222. Further, a second set of stepping commutators 224, 226 is provided on timing shaft 172 for controlling the backwinding incremental stepping operation.

Referring now additionally to FIGS. 5 and 6, it will be seen that the cumulative forward travel of slide 90' in response to operation of lead screw 202, plus the cumulative lengths of the three incremental forward steps of block 86' corresponds to the overall axial length of coil 48, and that the cumulative length of the rearward travel of block 86', plus the cumulative length of the rearward incremental steps of slide 90' also corresponds to the overall length of coil 48. Now, starting with an unwound coil form 12 and with slide 90' and block 86' positioned as shown in FIG. 9 with flyer 62 thus positioned adjacent but spaced from proximal end 14 of coil form 12, and with solenoid H deactuated so that half nut 204 engages lead screw 202, the winding operation is initiated with lead screw 202 traversing slide 90', block 86', splined shaft 66 and flyer 62 forwardly thereby to wind the first coil part 50-1 on the largest coil form step 46-1 in single-layer fashion. Upon occurrence of the early warning signal in output circuit 194 of turns counter 188 indicating that the first coil part 50-1 is within a few turns of completion, control 196 energizes motor 180 for slow-speed operation. Upon appearance of the coil completion signal in output circuit 192 indicating that the preselected number of turns has been completely wound in the first coil part 50-1, and upon proper rotational positioning of flyer 62 as sensed by commutator 181, control 196 actuates solenoid A to release latch 100 so that cylinder 96 moves block 86', splined shaft 66 and flyer 62 forwardly one incremental step until latch 102 engages abutment 106' (solenoid E having been initially actuated to actuate cylinder 96 to bias block 86' forwardly). Flyer 62 is now positioned to commence winding starting end 28-2 of the coil part 50-2 on coil form step 46-2, and control 196 again energizes motor 180 for high-speed operation. It will be observed that the forward traversing travel of slide 90' responsive to lead screw 202 continues during the stepping operation. In like fashion, block 86', splined shaft 66 and flyer 62 are shifted forwardly in incremental steps upon completion of first coil parts 50-2 and 50-3.

Upon completion of the winding of first coil part 50-4 on the smallest coil form step 46-4, as indicated by the respective coil completion signal in output circuit 192 of turns counter 188, and upon proper rotational positioning of flyer 62 as sensed by the traverse stepping commutator 183, control circuit 196 actuates solenoid H to actuate cylinder 208 thereby to disengage half nut 204 from lead screw 202, deactuates clutch brake 182 thereby to disconnect main drive motor 180 from shaft 78, actuates clutch brake 222 thereby to connect the very slow speed backwinding gear motor 220 to the drive shaft 78, actuates solenoid I to actuate cylinder 216 to bias slide 90' rearwardly, and actuates solenoid E to reverse cylinder 96 thereby immediately to shift block 86', splined shaft 66 and flyer 62 forwardly so as to position flyer 62 to wind remaining coil part 52-4, the slow rotation of flyer 62 by the gear motor 220 thus providing the crossover portion 58-4 during this rearward shifting of block 86'.

It will be observed that upon completion of the first coil part 50-4 on the smallest coil form 46-4 with slide 90' in its forwardmost position 200, latch 114' is engaging abutment 116' on slide 90', thus restraining rearward motion of slide 90' by cylinder 216 during rearward movement of block 86' and winding of the remaining coil part 52-4 on the smallest coil form step 46-4. Upon appearance of the coil completion signal in output circuit 192 of turns counter 188 indicating completion of the remaining coil part 52-4 on the smallest coil form step 46-4, and upon proper rotational positioning of flyer 62 as sensed by the backwind stepping commutator 226, control circuit 196 actuates solenoid D to actuate cylinder 132 thereby to release latch 114' from abutment 116', so that cylinder 216 moves slide 90', block 86', splined shaft 66 and flyer 62 rearwardly until latch 112' engages abutment 118'. Flyer 62 is now properly positioned for winding remaining coil part 52-3 on coil form step 46-3, the very slow speed of flyer 62 provided by the backwind gear motor 220 again providing the crossover portion 58-3 during the rearward incremental stepping movement of slide 90'. In similar fashion, slide 90', block 86', splined shaft 66 and flyer 62 are moved rearwardly in incremental steps upon completion of the remaining coil parts 52-3 and 52-2. Upon appearance of the coil completion signal in output circuit 192 indicating the completion of remaining coil part 52-1 on the largest coil form step 46-1, and the proper rotational positioning of flyer 62 sensed by stopping commutator 186, clutch brake 222 is deactuated to disconnect drive shaft 78 from the gear motor 220, thereby to stop the flyer.

Indexing mechanism 198 is then actuated to index turret 116 to rotate the fully wound coil form 12 away from the winding station and to index an unwound coil form 12 into the winding station at which point control circuit 196 deactuates solenoid H to deactuate cylinder 208 thereby to reengage half nut 204 with lead screw 202, actuates clutch brake 182 to couple main drive motor 180 to shaft 78, and energizes main drive motor 180 for high-speed operation thereby to commence winding a new coil 48, as above described.

At the conclusion of the rearward motion of block 86' as above described, limit switch LS-2 is actuated which actuates solenoid E to reverse the deactuation of cylinder 96 so as to bias block 86' forwardly, however, forward motion is restrained by latch 100, as above described. Actuation of limit switch LS-3 by slide 90' being moved to its extreme forward position actuates control circuit 196 to setup the stepping and stopping commutators for winding the next coil 48 in the reverse direction. Solenoid I is deactuated simultaneously with the deactuation of solenoid H thereby to terminate the rearward biasing force on slide 90' so as to permit lead screw 202 to move slide 90' forwardly during the next winding operation.

While there have been described above the principles of this invention in connection with specific apparatus, it is to be clearly understood that this description is made only by way of example and not as a limitation to the scope of the invention.

We claim:

1. The method of winding dynamoelectric machine field coils comprising the steps of: (a) providing at least one coil form having a distal end and a proximal end; (b) winding a first part of a coil on said form progressing in a forward direction from said proximal end toward said distal end with the starting end of said coil being adjacent said proximal end; and (c) without severing the wire from which said coil is wound, winding the remaining part of said coil on said form in a direction progressing rearwardly from said distal end toward said proximal end with the finishing end of said coil being adjacent said proximal end; said coil form having at least two progressively smaller steps, the largest being adjacent said proximal end and the smallest being adjacent said distal end, said coil when completely wound having a section on each of said coil form steps, each of said sections having a predetermined total number of turns including said parts, said first-named and remaining parts being wound in the same direction.

2. The method of claim 1 wherein said winding step (b) comprises: (1) successively winding a first part of the predetermined number of turns of each section of said coil with the exception of the section on said smallest step, and (2) winding all of the section on said smallest step; said winding step (c) comprising successively winding the remaining parts of each of said sections of said coil wound in step (b) (1).

3. The method of claim 2 wherein the first part of each said section wound in step (b) (1) comprises approximately one-half said total number of turns thereof.

4. The method of claim 2 wherein the remaining parts of each section wound in step (c) are wound over the respective first part of the same section wound in step (b) (1).

5. The method of claim 2 wherein each of said parts wound in steps (b) (1) and (c), and said section wound in step (b) (2) are random wound.

6. The method of claim 1 wherein the turns of each of said sections are wound in a single layer, said remaining parts of each section wound in step (c) being adjacent the respective first part of the same section wound in step (b).

7. The method of claim 1 wherein the turns of each of said sections are wound in a single layer, said step (b) comprising successively winding a first part of each of said sections on the respective step in a forward direction progressing toward said distal end; said step (c) comprising successively winding the remaining parts of each of said sections on the respective step in a rearward direction progressing toward said proximal end.

8. The method of claim 7 wherein each of said remaining parts comprises a relative small number of the total number of turns of the respective section.

9. The method of claim 8 wherein the starting end of each said first part is spaced from the rear end of the respective step and the finishing end is adjacent the forward end of the respective step, the said remaining part of the section on the smallest one of said steps having a crossover portion extending helically over the respective first part from the finishing end thereof to the respective space, and a second portion wound on said smallest step in the respective space, said remaining parts of the remaining sections respectively having crossover portions extending helically over the respective first part from the second portion of the preceding remaining part to the respective space and a second portion wound on the respective step in the respective space.

10. The method of claim 9 wherein there is a connecting portion extending forwardly between the finishing end and starting end of adjacent first parts, said connecting portions being disposed in axial alignment on one side of said coil, said crossover portions being disposed in axial alignment on the side of said coil opposite said one side.

11. The method of claim 1 wherein said step (a) comprises providing at least two substantially identical coil forms, and comprising the further steps of: (d) relatively moving the first coil form having the first coil wound thereon in steps (b) and (c) away from cooperative relationship with winding apparatus, and relatively moving a second coil form into cooperative relationship with said winding apparatus; and (e) without severing the wire connecting the first and second coils, repeating steps (b) and (c) thereby to wind a second coil on said coil form with the starting end of said second coil being a continuation of the finishing end of said first coil.

12. The method of claim 11 wherein said coil forms have their said proximal ends secured to a support and extend radially outwardly therefrom in angularly spaced relation, said step (d) comprising rotating said support, the portion of said wire connecting said finishing end of said first coil and said starting end of said second coil being adjacent said support.

13. Apparatus for winding dynamoelectric machine field coils comprising: at least one coil form having a distal end and a proximal end; means for supporting said proximal end; means for winding a coil on said form; means for relatively moving said winding means axially with respect to said form thereby to traverse said winding means across said form; and means for actuating said moving means to wind a first part of a coil on said form progressing forwardly in a direction from said proximal end toward said distal end with the starting end of said coil being adjacent said proximal end and to wind the remaining part of said coil on said form in a direction progressing rearwardly from said distal end toward said proximal end with the finishing end of said coil being adjacent said proximal end; said coil form having at least two steps, the largest being adjacent said proximal end and the smallest being adjacent said distal end, said coil when completely wound having a section on each of said steps, each of said sections having a predetermined total number of turns including both of the respective parts.

14. The apparatus of claim 13 wherein said actuating means includes means coupled to said winding means for counting the number of turns wound on said form, said counting means including means for providing a signal in response to winding a selected number of turns on each of said steps, and means coupling said counting means to said moving means for actuating the same in response to said counting means.

15. The apparatus of claim 13 wherein said moving means includes first means for sequentially shifting said winding means forwardly in incremental steps thereby sequentially to position said winding means for winding on respective coil form steps, second means for sequentially shifting said winding means rearwardly in incremental steps thereby sequentially to position said winding means for winding on respective coil form steps; and means for traversing said winding means across said coil form independently of said first and second shifting means, and further comprising means for coupling said actuating means to said first and second shifting means, said actuating means actuating said first and second shifting means in succession thereby to wind said first and remaining coil parts on said coil form.

16. The apparatus of claim 15 wherein said winding means comprises a flyer mounted on a shaft, and drive means for rotating said shaft and flyer thereby to wind said coil on said coil form; said moving means further including first means for rotatably supporting said shaft, second means for supporting said first support means for axial movement of the same and said shaft and flyer with respect to said coil form, third means for supporting said second support means for axial movement of said first and second support means and said shaft and flyer with respect to said coil form, and means for operatively connecting said traversing means to said second support means; said first shifting means acting upon said first support means, and said second shifting means acting upon one of said first and second support means.

17. The apparatus of claim 16 wherein said moving means further includes means on said second support means and operatively connected to said first support means for selectively moving the same and said shaft and flyer axially in forward and rearward directions; said actuating means including means for actuating said last-named moving means for forward movement of said first support means, shaft and flyer during winding of said first coil part and for rearward movement thereof during winding of said remaining part; said first shifting means comprising first latching means acting upon said first support means for selectively restraining said forward movement of said first support means, shaft and flyer at at least one intermediate position thereby providing said forward incremental steps; said second shifting means comprising second latching means acting upon said first support means for selectively restraining said rearward movement of said first support means, shaft and flyer at at least one intermediate position thereby providing said rearward incremental steps.

18. The apparatus of claim 17 wherein each of said forward and reverse incremental steps generally corresponds to the axial length of the respective coil form steps; said traversing means comprising means for axially oscillating said second support means with a throw generally corresponding to the axial length of said coil form steps.

19. The apparatus of claim 16 wherein said moving means further includes first means on said second support means and operatively connected to said first support means for selectively moving the same and said shaft and flyer axially in forward and reverse directions, and second means on said third support means and operatively connected to said second support means for moving the same and said first support means, shaft and flyer axially rearwardly, said actuating means including means for actuating said first moving means for forward movement of said first support means, shaft and flyer during winding of said first coil part, means for actuating said traversing means for forward movement of said second and first support means, shaft and flyer during winding of said first part, and means for actuating said second moving means for rearward movement of said second and first support means, shaft and flyer during winding of said remaining part; said first shifting means comprising first latching means acting upon said first support means for selectively restraining said forward movement of said first support means, shaft and flyer at at least one intermediate position thereby providing said forward incremental steps; said second shifting means comprising second latching means acting upon said second support means for selectively restraining said rearward movement of said second and first support means, shaft and flyer at at least one intermediate position thereby to provide said rearward incremental steps.

20. The apparatus of claim 19 wherein said traversing means comprises means for continuously moving said second and first support means, shaft and flyer forwardly thereby winding the turns of said first winding part on said form in a single layer; each of said forward incremental steps being substantially shorter than the axial length of said coil form steps, each of said rearward incremental steps generally corresponding to the axial lengths of the respective coil form steps.

21. The apparatus of claim 20 wherein the cumulative length of said forward incremental steps is no greater than the axial length of one of said coil form steps.

22. The apparatus of claim 21 wherein said drive means includes means for rotating said shaft and flyer at first and second speeds, said second speed being substantially slower than said first speed, said actuating means including means for actuating said drive means to said second speed during said rearward movement of said second and first support means, shaft and flyer.

23. The apparatus of claim 22 wherein said actuating means includes means for actuating said first moving means for reverse movement of said first support means, shaft and flyer during winding of the remaining part of one of said coil sections, and means coupled to said drive means for counting the number of turns wound on said form, said counting means including means for providing a signal in response to winding a selected number of turns on each of said steps in each direction of movement of said flyer, means coupling said actuating means to said first latching means for sequentially actuating the same in response to winding of the selected number of turns on each of said coil form steps in the forward direction, and means coupling said actuating means to said second latching means for sequentially actuating the same in response to winding of the selected number of turns on each of said coil form steps in the reverse direction.

* * * * *

UNITED STATES PATENT OFFICE
CERTIFICATE OF CORRECTION

Patent No. 3,636,990           Dated January 25, 1972

Inventor(s) Robert J. Eminger and William N. Brown

It is certified that error appears in the above-identified patent and that said Letters Patent are hereby corrected as shown below:

IN THE SPECIFICATION

Column 4, line 51, change "48-1" to --48-4-- ;
Column 5, line 55, after "122" insert --on block 86. In the illustrated embodiment, abutments 104, 106, 108 and 110, and abutments 116, 118, 120 and 122--;
Column 8, line 69, after "coil" insert --completion signal indicating completion of the winding of coil-
Column 11, line 12, change "for", second occurrence, to -- of --
Column 12, line 10, change "$_1$14'" to --114'--.

Signed and sealed this 26th day of December 1972.

(SEAL)
Attest:

EDWARD M. FLETCHER, JR.           ROBERT GOTTSCHALK
Attesting Officer           Commissioner of Patents